(12) United States Patent
Hung (10) Patent No.: US 10,990,661 B2
(45) Date of Patent: Apr. 27, 2021

(54) ELECTRONIC DEVICE AND METHOD FOR SECURING ELECTRONIC DEVICE

(71) Applicant: Quanta Computer Inc., Taoyuan (TW)

(72) Inventor: Li-Te Hung, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 109 days.

(21) Appl. No.: 16/375,949

(22) Filed: Apr. 5, 2019

(65) Prior Publication Data

US 2020/0143023 A1 May 7, 2020

(30) Foreign Application Priority Data

Nov. 1, 2018 (TW) .................................. 107138709

(51) Int. Cl.
*G06F 21/32* (2013.01)
*G06K 9/00* (2006.01)

(52) U.S. Cl.
CPC ............ *G06F 21/32* (2013.01); *G06K 9/0002* (2013.01)

(58) Field of Classification Search
CPC .............................. G06F 21/32; G06K 9/0002
USPC ........................................................... 726/2
See application file for complete search history.

(56) References Cited

U.S. PATENT DOCUMENTS

| | | | | | |
|---|---|---|---|---|---|
| 5,805,403 | A * | 9/1998 | Chemla | ................... | G06F 1/206 361/103 |
| 8,594,339 | B2 * | 11/2013 | Dufresne | ................. | A61B 7/04 381/67 |
| 9,692,304 | B1 * | 6/2017 | Luo | ..................... | H02M 3/1584 |
| 2006/0086099 | A1 * | 4/2006 | Dickerson | .............. | F25J 1/0017 62/47.1 |
| 2009/0141945 | A1 * | 6/2009 | Milne | .................. | G06K 9/6293 382/116 |
| 2013/0100599 | A1 * | 4/2013 | Wang | .................... | G06F 9/4401 361/679.02 |
| 2013/0227261 | A1 * | 8/2013 | Anderson | ............... | G06F 1/206 713/2 |
| 2014/0327540 | A1 * | 11/2014 | Shin | ..................... | G08B 25/006 340/539.11 |
| 2015/0195099 | A1 * | 7/2015 | Imes | ................... | H04L 12/2803 700/275 |
| 2016/0337559 | A1 * | 11/2016 | Liu | ..................... | G06K 9/00013 |
| 2017/0147800 | A1 * | 5/2017 | Huang | .................... | G06F 21/32 |
| 2017/0344791 | A1 * | 11/2017 | Osborne | .............. | G06F 1/1643 |

OTHER PUBLICATIONS

NPL Search Terms (Year: 2020).*
NPL Search Terms (Year: 2021).*

* cited by examiner

*Primary Examiner* — Syed A Zaidi
(74) *Attorney, Agent, or Firm* — McClure, Qualey & Rodack, LLP (57) ABSTRACT

An electronic device includes a power button, a fingerprint sensor, and a controller. The fingerprint sensor is integrated into the power button. The controller connects to the fingerprint sensor and the power button. The controller performs a booting process of the electronic device when the power button is pushed by an external object. The controller then compares the fingerprint pattern of the external object sensed by the fingerprint sensor with a previously stored fingerprint pattern. If the fingerprint pattern does not match the previously stored fingerprint pattern, the controller stops the booting process.

6 Claims, 6 Drawing Sheets

ELECTRONIC DEVICE AND METHOD FOR SECURING ELECTRONIC DEVICE

CROSS REFERENCE TO RELATED APPLICATIONS

This Application claims priority of Taiwan Patent Application No. 107138709, filed on Nov. 1, 2018, the entirety of which is incorporated by reference herein.

BACKGROUND

Field of the Invention

The present disclosure relates to an electronic device, and, in particular, to an electronic device having a power button including a fingerprint sensor.

Description of the Related Art

In modern society, electronic devices are widely used, such as notebooks, tablets, and mobile phones. These electronic devices often have anti-theft technology to prevent the data and information in the electronic device from being stolen. For example, the electronic device may have a fingerprint sensor, and the user must pass fingerprint authentication to use the electronic device and obtain access to data and information.

However, the fingerprint sensor on the electronic device is usually conspicuous and the theft will beware it. Additionally, when using the fingerprint sensor of the electronic device, the electronic device is usually completely turned on (i.e., the booting process is over, the electronic device is ready to enter the system (or desktop)), so that the data and information in the electronic device are easily stolen due to the forged fingerprint or the electronic device is cracked.

Therefore, as information security becomes more and more important, electronic devices need to have further anti-theft technology to prevent the data and information in the electronic device from being stolen.

BRIEF SUMMARY

The present disclosure provides an electronic device. The electronic device includes a power button, a fingerprint sensor, and a controller. The fingerprint sensor is integrated into the power button. The controller is connected to the fingerprint sensor and the power button. The controller performs a booting process of the electronic device when the power button is pushed by an external object, the controller then compares the fingerprint pattern of the external object sensed by the fingerprint sensor with a previously stored fingerprint pattern, the controller stops the booting process if the fingerprint pattern does not match the previously stored fingerprint pattern.

The present disclosure provides a method for preserving an electronic device. The method includes integrating a fingerprint sensor into a power button; a controller performs a booting process of the electronic device in response to the power button being pressed by an external object; the fingerprint sensor senses the fingerprint pattern of the external object; and the fingerprint pattern is compared with a previously stored fingerprint pattern, wherein if the fingerprint pattern does not match the previously stored fingerprint pattern, the controller stops the booting process.

BRIEF DESCRIPTION

In order to describe the manner in which the above-recited and other advantages and features of the disclosure can be obtained, a more particular description of the principles briefly described above will be rendered by reference to specific examples thereof which are illustrated in the appended drawings. It should be understood that these drawings depict only exemplary aspects of the disclosure and are therefore not to be considered to be limiting of its scope. The principles herein are described and explained with additional specificity and detail through the use of the accompanying drawings, in which.

DETAILED DESCRIPTION

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at, near, or nearly at," or "within 3-5% of," or "within acceptable manufacturing tolerances," or any logical combination thereof, for example.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. For example, if the device in the figures is turned over, elements described as being "below" or "beneath"

other elements or features would then be oriented "above" the other elements or features. Thus, the exemplary term "below" can encompass both an orientation of above and below. The apparatus may be otherwise oriented (rotated 90 degrees or at other orientations) and the spatially relative descriptors used herein may likewise be interpreted accordingly.

As discussed above, the electronic device needs to have anti-theft technology to prevent the data and information in the electronic device from being stolen. In the present embodiment, a power button of the electronic device integrates with a fingerprint sensor, a temperature sensor, and a proximity sensor to achieve the anti-theft effect. In the present embodiment, the power button of the electronic device is pressed by an external object to perform a booting process of the electronic device, thereby attempting to enter the electronic device, so that the data and information in the electronic device are acquired. The external object may be an object that does not have a fingerprint pattern, an object that has a forged fingerprint pattern, or a finger (which necessarily has a fingerprint).

Figure 1:
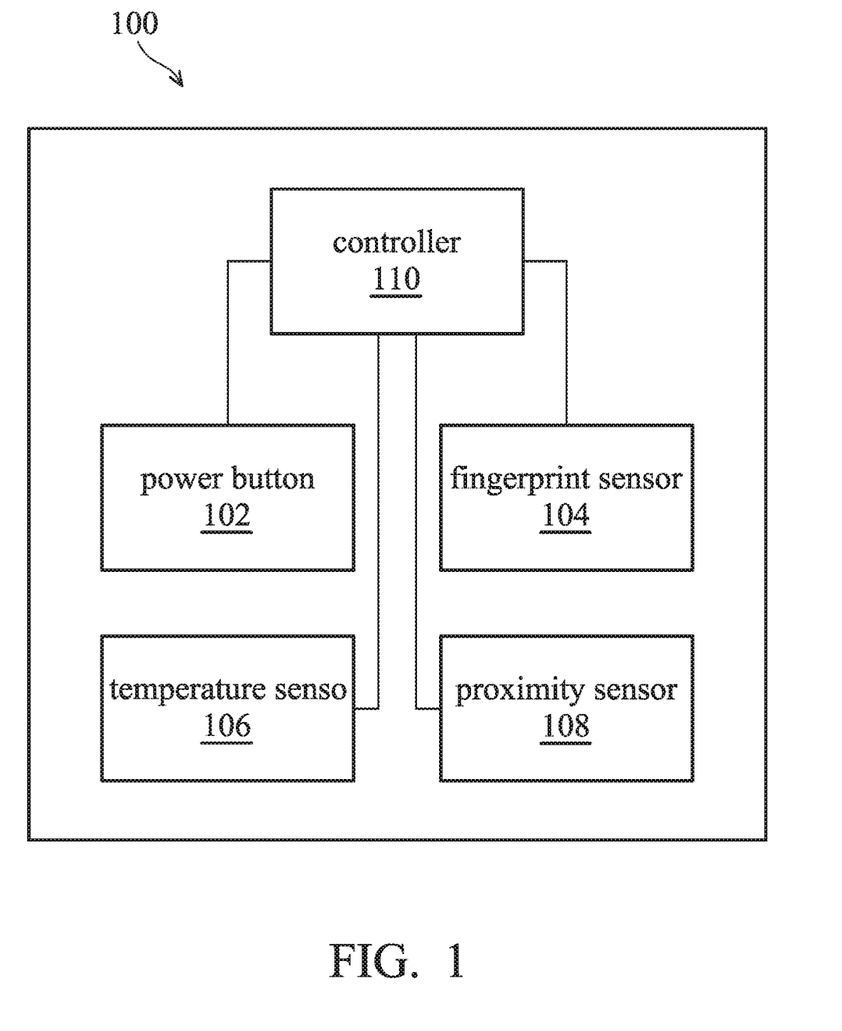
FIG. 1 illustrates an electronic device, in accordance with some embodiments of the present disclosure.

FIG. 1 illustrates an electronic device, in accordance with some embodiments of the present disclosure. The electronic device 100 includes a power button 102, a fingerprint sensor 104, a temperature sensor 106, a proximity sensor 108, and a controller 110.

The power button 102 is connected to the controller. When the power button 102 is pressed by an external object, the controller 110 performs a booting process of the electronic device 100. For example, the controller 110 notifies the processor of the electronic device 100 (not shown) to execute a booting operation to perform a basic input/output system (BIOS) to boot the electronic device 100.

The fingerprint sensor 104 is connected to the controller 110 and integrated into the power button 102. The fingerprint sensor 104 may sense the fingerprint pattern of the external object that presses the power button 102 and may transmit the fingerprint pattern to the controller 110. In some embodiments, the fingerprint sensor 104 may be a capacitive fingerprint sensor, an optical fingerprint sensor, or another suitable fingerprint sensor.

The temperature sensor 106 is connected to the controller 110 and integrated into the power button 102. The temperature sensor 106 may sense the temperature of the external object that presses the power button 102. For example, when the external object presses the power button 102, the temperature sensor 106 may sense the temperature of the external object that is in contact with the surface of the power button 102. In the present embodiment, a predetermined temperature range is set in the temperature sensor 106.

The proximity sensor 108 is connected to the controller 110 and integrated into the power button 102. The proximity sensor 108, also referred to as a distance sensor, is a sensor that can detect nearby external objects without contact. The proximity sensor may emit an electromagnetic field or a beam of electromagnetic radiation (e.g., infrared), and looks for changes in the field or return signal to obtain a distance from the proximity sensor 108 (the power button 102) to the external object. In the present embodiment, a predetermined distance is set in the proximity sensor 108.

As described above, the controller 110 is connected to the power button 102, the fingerprint sensor 104, the temperature sensor 106, and the proximity sensor 108. The controller 110 receives signals or data from the power button 102, the fingerprint sensor 104, the temperature sensor 106, and the proximity sensor 108, and performs a plurality of operations to control the power button 102, the fingerprint sensor 104, the temperature sensor 106, and the proximity sensor 108. The controller 110 is also referred to as an embedded controller (EC) for controlling peripheral devices of the main input/output (I/O) and the power management of the advanced configuration and power interface (ACPI) of the electronic device 100. In some embodiments, the storage device (e.g., a memory) of the controller 110 has one or more previously stored fingerprint patterns. In other embodiments, other memory in the electronic device 100 has one or more previously stored fingerprint patterns, and the controller 110 can read these previously stored fingerprint patterns.

In a conventional electronic device, the controller is powered by a power control unit (PCU) in the electronic device. In the present embodiment, the fingerprint sensor 104, the temperature sensor 106, the proximity sensor 108, and the controller 110 are collectively powered by the power control unit (PCU) in electronic device 100. Therefore, the electronic device 100 has no additional power components and costs no more than a conventional electronic device. In some embodiments, when the electronic device 100 is turned off, the fingerprint sensor 104, the temperature sensor 106, the proximity sensor 108, and the controller 110 are still powered, but the fingerprint sensor 104 and the temperature sensor 106 are disabled (or turned off) to avoid additional power consumption of the fingerprint sensor 104 and the temperature sensor 106.

Figure 2:
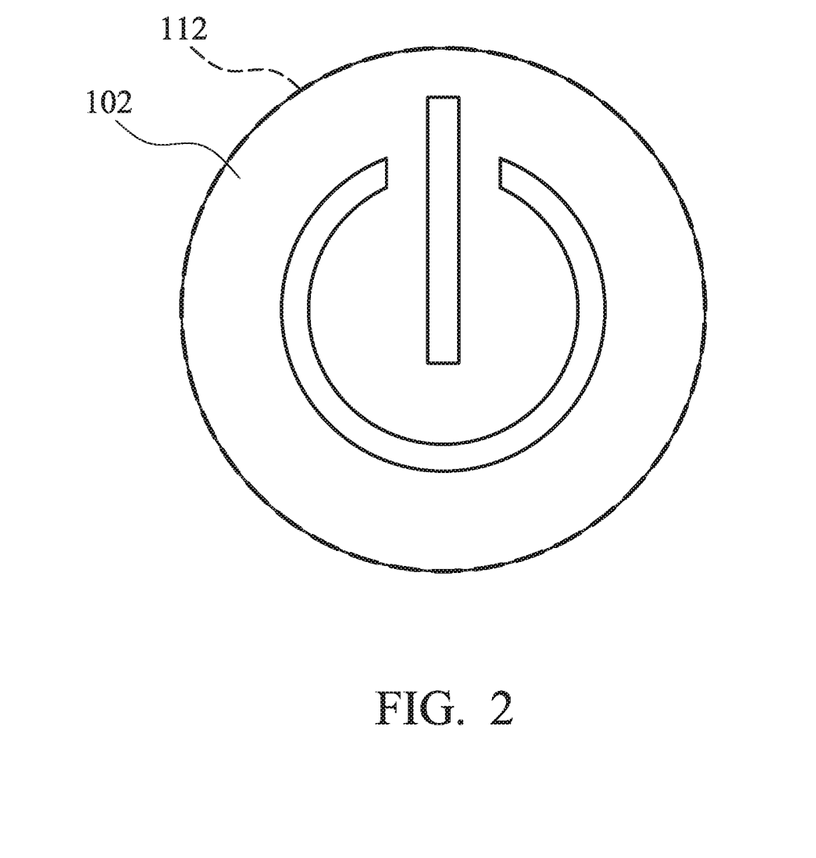
FIG. 2 illustrates a power button, in accordance with some embodiments of the present disclosure.

As discussed above, the fingerprint sensor 104, the temperature sensor 106, and the proximity sensor 108 are integrated into the power button 102. In other words, the power button 102 includes the fingerprint sensor 104, the temperature sensor 106, and the proximity sensor 108. In some embodiments, as shown in FIG. 2, the fingerprint sensor 104, the temperature sensor 106, and the proximity sensor 108 are integrated on an upper surface 112 of the power button 102. Therefore, it should be understood that the fingerprint sensor 104 can sense the fingerprint pattern of the external object, which can also be referred to as the power button 102 can sense the fingerprint pattern of the external object; the temperature sensor 106 can sense the temperature of the external object, which can also be referred to as the power button 102 can sense the temperature of the external object; the proximity sensor 108 can sense the distance between the proximity sensor 108 and the external object, which can also be referred to as the power button 102 can sense the distance between the power button 102 and the external object.

The operation of the power button 102, the fingerprint sensor 104, the temperature sensor 106, the proximity sensor 108, and the controller 110 will be described later with reference from FIGS. 3A to 3D.

Figure 3A:
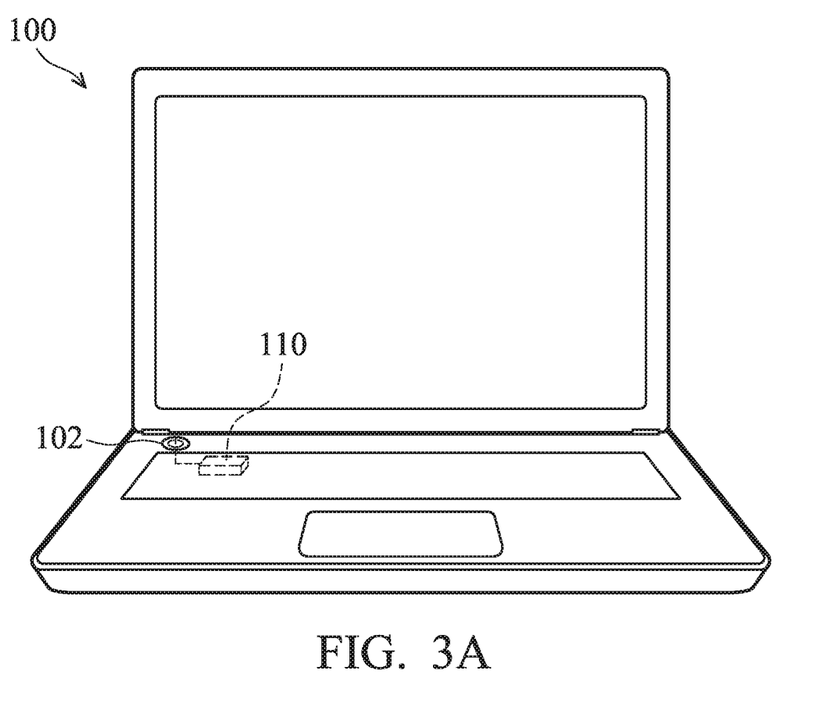
FIG. 3A illustrates an electronic device, in accordance with some embodiments of the present disclosure.

FIG. 3A illustrates an electronic device, in accordance with some embodiments of the present disclosure. As shown in FIG. 3A, the electronic device 100 includes a power button 102 (the power button 102 integrates with a fingerprint sensor 104, a temperature sensor 106, and a proximity sensor 108) and a controller 110. In this embodiment, the electronic device 100 is a notebook. In other embodiments, the electronic device 100 can be a mobile phone or other electronic device. It should be understood that the locations of the power button 102 and the controller 110 are exemplary, and are not intended to limit the present disclosure.

While the electronic device 100 is turned off, the fingerprint sensor 104 and the temperature sensor 106 are disabled (or turned off) to avoid additional power consumption of the fingerprint sensor 104 and the temperature sensor 106. As discussed above, the proximity sensor 108 may sense the distance between the external object and the proximity sensor 108 (which also referred to as the power button 102 may sense the distance between the external object and the power button 102, as discussed above). In this embodiment, the proximity sensor 108 may sense the distance between the external object directly above the surface of the power button 102 (the proximity sensor 108) and the power button 102. When the distance between the external object and the power button 102 (the proximity sensor 108) is within a predetermined distance (e.g., 5 cm), the proximity sensor 108 transmits a signal to the controller 110, so that the controller 110 enables (or turns on) the fingerprint sensor 104 and the temperature sensor 106.

However, if the distance between the external object and the power button 102 (the proximity sensor 108) is within the predetermined distance, but the external object does not press the power button 102 within the predetermined time (e.g., 3 seconds) (i.e., the controller 110 does not receive a signal indicating that the power button 102 is pressed), the controller 110 disables (or turning off) the fingerprint sensor 104 and the temperature sensor 106 to avoid additional power consumption and misjudgment.

In some embodiments, the electronic device 100 does not have a proximity sensor 108, while the fingerprint sensor 104 and the temperature sensor 106 are enabled (or turned on) continuously.

When the external object presses the power button 102 within the predetermined time, the controller 110 first performs the booting process of the electronic device 100. At the same time, during the booting process, but before the electronic device 100 is fully booted (e.g., while performing the BIOS, before the electronic device 100 enters the desktop, or before the screen of the electronic device 100 displaying), the controller controls the booting process according to the signals of the fingerprint sensor 104 and the temperature sensor 106.

When the power button 102 is pressed, the controller 110 first performs the booting process, while the fingerprint sensor 104 senses the fingerprint pattern of the external object pressing the power button 102 and the temperature sensor 106 senses the temperature of the external object pressing the power button 102. Next, the fingerprint sensor 104 transmits the fingerprint pattern of the external object to the controller 110. The temperature sensor 106 transmits a determination result that whether or not the temperature of the external object is within the predetermined temperature range to the controller 110.

During the booting process, and after the controller 110 receives the fingerprint pattern and temperature of the external object, the controller 110 then compares the received fingerprint pattern (i.e., the fingerprint pattern sensed by the fingerprint sensor 104) with the previously stored fingerprint pattern (as discussed above), and the temperature sensor 106 determines whether the temperature of the external object is within the predetermined temperature range. In some embodiments, the predetermined temperature range is from 21° C. to 45° C. In other embodiments, the predetermined temperature range is substantially a variation range of human body temperature.

Figure 3B:
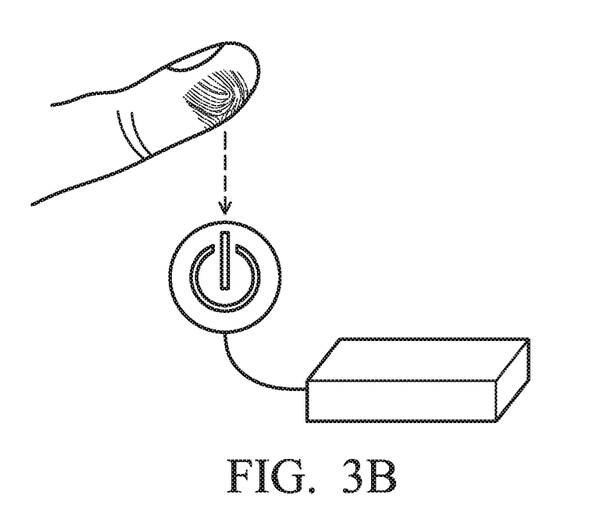
FIG. 3B illustrates that a finger presses the power button of the electronic device, in accordance with some embodiments of the present disclosure.

As shown in FIG. 3B, if the external object is a finger, the temperature sensor 106 senses that the temperature is within the predetermined temperature range. If the fingerprint pattern received by the controller 110 matches the previously stored fingerprint pattern, the controller 110 does not stop the booting process (i.e., the electronic device 100 continues to perform the booting process).

Figure 3C:
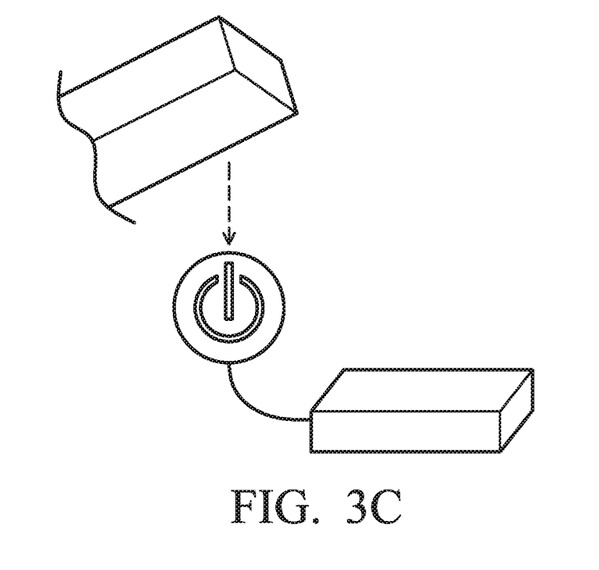
FIG. 3C illustrates that an object without a fingerprint pattern presses the power button of the electronic device, in accordance with some embodiments of the present disclosure.

As shown in FIG. 3C, if the external object is an object (e.g., a pen) that does not have a fingerprint pattern, the temperature sensor 106 senses that the temperature is not within the predetermined temperature range, and the controller 110 stops the booting process in the above discussion. Furthermore, the external object does not have a fingerprint pattern, the controller 110 does not receive the fingerprint pattern (the fingerprint sensor 104 cannot sense that there is the fingerprint pattern), the controller 110 also stops the booting process.

Figure 3D:
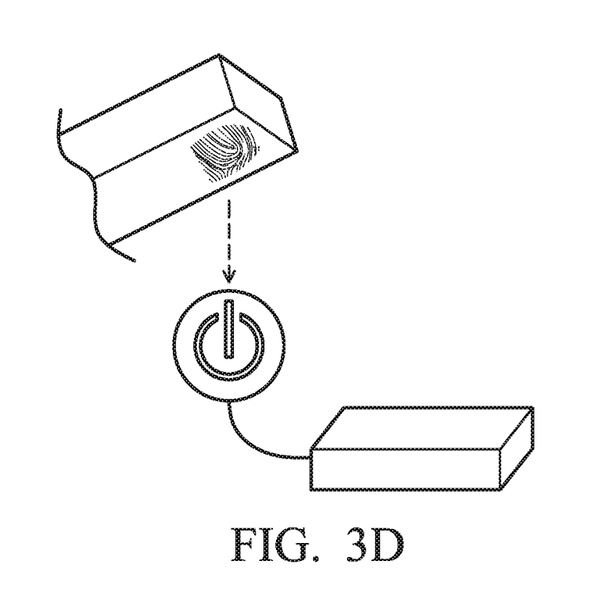
FIG. 3D illustrates that an object having a forged fingerprint pattern presses the power button of the electronic device, in accordance with some embodiments of the present disclosure.

As shown in FIG. 3D, if the external object is an object having a forged fingerprint pattern, the fingerprint pattern received by the controller 110 matches the previously stored fingerprint pattern. However, the temperature sensor 106 senses that the temperature is not within the predetermined temperature range, and the controller 110 stops the booting process.

In some embodiments, the electronic device 100 does not have a temperature sensor 106. The controller 110 controls the booting process only according to the signal of the fingerprint sensor 104. In some embodiments, the predetermined temperature range in temperature sensor 106 will be adjusted according to room temperature. For example, the temperature sensor 106 first senses the room temperature, and then the temperature sensor 106 determines whether the difference between the temperature of the external object and the room temperature is greater than a predetermined value (e.g., 2° C. to 3° C.), wherein the predetermined value can also be changed with time and season. For example, the date information in CMOS can be read first, and the predetermined value is set. If the difference between the temperature of the external object and the room temperature is greater than the predetermined value, the controller 110 does not stop the booting process.

In some embodiments, after the controller 110 receives the fingerprint pattern, the controller 110 transmits the fingerprint pattern to the cloud server through the network or stores the fingerprint pattern to a hard disk to establish a fingerprint database for subsequent use.

According to the embodiments discussed above, the fingerprint identification and the temperature identification must be passed so that the electronic device 100 will continue to perform the booting process, thereby entering the electronic device 100 to obtain the data and information.

It should be noted that, as discussed above, when the power button 102 is pressed, the controller 110 first performs the booting process. During the boot process, the controller 110 and the temperature sensor 106 then perform the fingerprint identification and the temperature identification. This means that the boot time of the electronic device 100 does not require additional time for fingerprint recognition and temperature recognition. Specifically, the boot time of the electronic device 100 in the present embodiment is the same as that of the conventional electronic device.

Figure 4A:
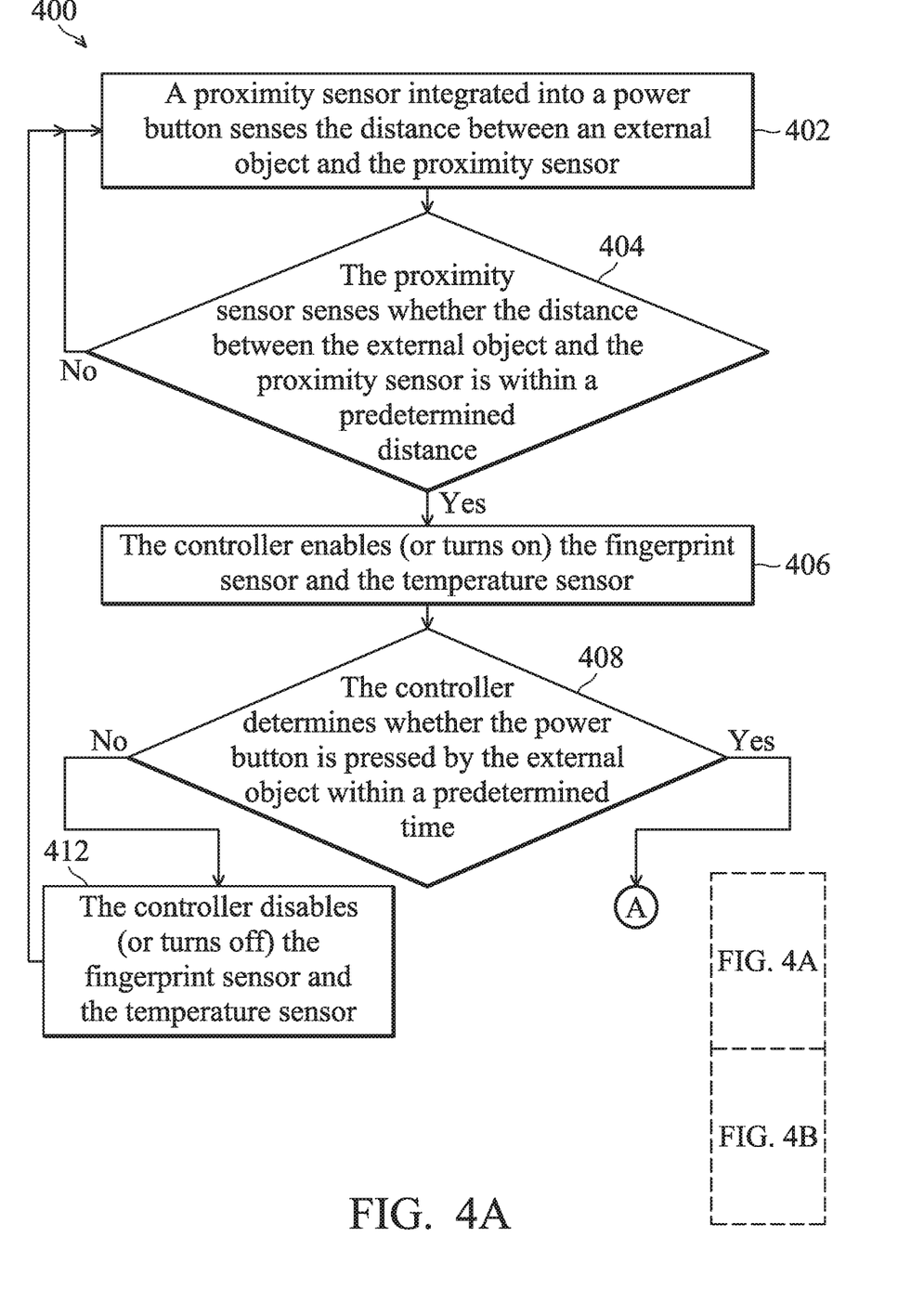
FIGS. 4A and 4B illustrate a flowchart of a method 400 for operating an electronic device, in accordance with some embodiments of the present disclosure.
Figure 4B:
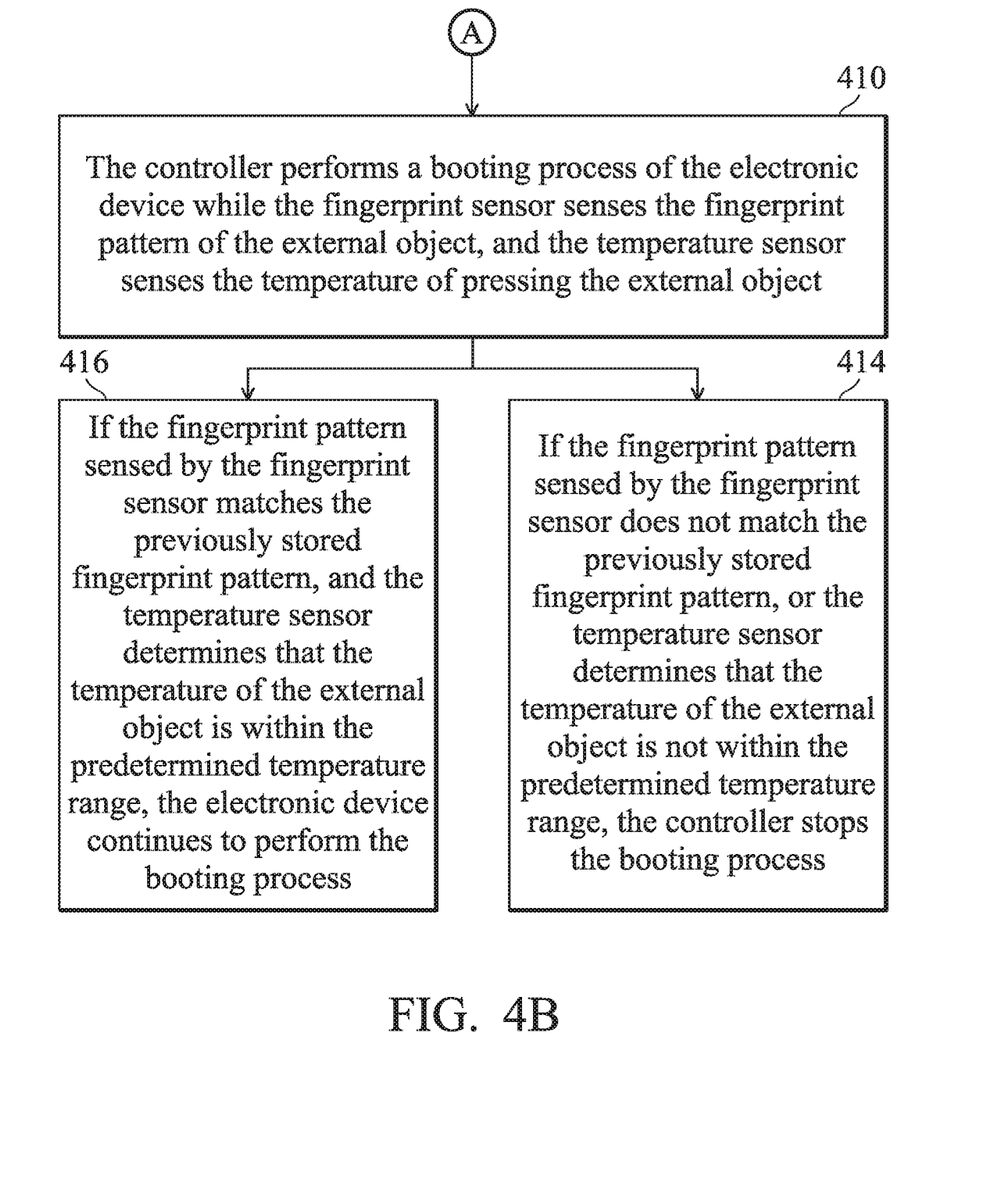

FIGS. 4A and 4B illustrate a flowchart of a method 400 for operating an electronic device, in accordance with some embodiments of the present disclosure. In operation 402, a proximity sensor integrated into a power button senses the distance between an external object and the proximity sensor (the power button). For example, the proximity sensor 108 may sense the distance between the external object directly above the surface of the power button 102 (the proximity sensor 108) and the power button 102 (the proximity sensor 108).

In operation 404, the proximity sensor senses whether the distance between the external object and the proximity sensor (the power button) is within a predetermined distance. For example, the proximity sensor 108 senses whether the distance between the external object and proximity sensor 108 (the power button 102) is within a predetermined distance.

If the proximity sensor senses that the distance between the external object and the proximity sensor (the power button) is within the predetermined distance. In operation 406, the controller enables (or turns on) the fingerprint sensor and the temperature sensor. In operation 406, it may also check that whether the electronic device 100 is in an off state, and then the controller enables (or turns on) the fingerprint sensor and the temperature sensor. For example, if the proximity sensor 108 senses that the distance between the external object and the proximity sensor 108 (the power button 102) is within the predetermined distance, the proximity sensor 108 transmits a signal to the controller 110, such that the controller 110 enables (or turns on) the fingerprint sensor 104 and the temperature sensor 106.

If the proximity sensor senses that the distance between the external object and the proximity sensor (the power button) is not within the predetermined distance, return to operation 402.

In operation 408, the controller determines whether the power button is pressed by the external object within a predetermined time. For example, the controller 110 determines whether receiving a signal that the power button 102 has been pressed within the predetermined time.

If the power button is pressed by the external object within the predetermined time, then operation 410, the controller performs a booting process of the electronic device while the fingerprint sensor senses the fingerprint pattern of the external object, and the temperature sensor senses the temperature of pressing the external object. For example, if the power button 102 is pressed by an external object within the predetermined time, the controller 110 responds to a signal indicating that the power button 102 is pressed by the external object to perform the booting process of the electronic device, while the fingerprint sensor 104 senses the fingerprint pattern of the external object that presses the power button 102, and the temperature sensor 106 senses the temperature of the external object that presses the power button 102.

If the power button is not pressed by the external object within the predetermined time. In operation 412, the controller disables (or turns off) the fingerprint sensor and the temperature sensor. For example, if the power button 102 is not pressed by the external object within the predetermined time, the controller 110 disables (or turns off) the fingerprint sensor 104 and the temperature sensor 106, and the method 400 returns to operation 402.

In operation 414, if the fingerprint pattern sensed by the fingerprint sensor does not match the previously stored fingerprint pattern, or the temperature sensor determines that the temperature of the external object is not within the predetermined temperature range, the controller stops the booting process. For example, the fingerprint sensor 104 transmits the fingerprint pattern of the external object to the controller 110, so that the controller 110 compares the received fingerprint pattern (i.e., the fingerprint pattern sensed by the fingerprint sensor 104) with the previously stored fingerprint pattern. The temperature sensor 106 determines whether the temperature of the external object is within the predetermined temperature range, and transmits the determination result to the controller 110. If the fingerprint pattern sensed by the fingerprint sensor 104 does not match the previously stored fingerprint pattern, or the temperature sensor 106 determines that the temperature of the external object is not within the predetermined temperature range, the controller 110 stops the booting process.

In operation 416, if the fingerprint pattern sensed by the fingerprint sensor matches the previously stored fingerprint pattern, and the temperature sensor determines that the temperature of the external object is within the predetermined temperature range, the electronic device continues to perform the booting process. For example, if the fingerprint pattern sensed by the fingerprint sensor 104 matches the previously stored fingerprint pattern, and the temperature sensor 106 determines that the temperature of the external object is within the predetermined temperature range, the electronic device 100 continues to perform the booting process.

The embodiments of the present disclosure offer advantages over existing art, though it should be understood that other embodiments may offer different advantages, not all advantages are necessarily discussed herein, and that no particular advantage is required for all embodiments.

In conventional electronic devices, the power button is not integrated with a fingerprint sensor. The fingerprint sensor additionally occupies an area of the electronic device. For example, in a conventional notebook computer, a fingerprint sensor typically occupies an additional area on the base of the notebook (also referred to as a C cover). In addition, since the fingerprint sensor will occupy an additional area, the fingerprint reader will be conspicuous and the theft will beware it.

By utilizing the embodiments of the present disclosure, the power button of the electronic device integrates with a fingerprint sensor, the fingerprint sensor does not additionally occupy an area of the electronic device, and the power button integrated with the fingerprint sensor looks the same as the normal power button, and it is not conspicuous that the power button has the fingerprint sensor.

The power button of the electronic device of the present disclosure integrates with a fingerprint sensor and a temperature sensor, so that the electronic device has further anti-theft technology to prevent data and information in the electronic device from being stolen. In other words, since the power button integrates with the fingerprint sensor and the temperature sensor, it is necessary to use the real finger with the correct fingerprint pattern to press the power button of the electronic device to turn on the electronic device to obtain the data and information in the electronic device. In some embodiments, the controller transmits the sensed fingerprint pattern to a cloud server or to a hard drive for subsequent use. For example, if a thief presses the power button of the electronic device, the fingerprint pattern of the thief is transmitted to the cloud server for tracking of the thief.

The terminology used herein is for the purpose of describing particular embodiments only, and is not intended to be limiting of the invention. As used herein, the singular forms "a", "an" and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore terms, such as those defined in commonly used dictionaries, should be interpreted as having a meaning that is consistent with their meaning in the context of the relevant art, and will not be interpreted in an idealized or overly formal sense unless expressly so defined herein.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An electronic device, comprising:
a power button;
a fingerprint sensor, integrated into the power button;
a temperature sensor, integrated into the power button;
a proximity sensor, integrated into the power button; and
a controller, connected to the fingerprint sensor, the power button and the proximity sensor, wherein the controller performs a booting process of the electronic device when the power button is pushed by an external object, the controller then compares a fingerprint pattern of the external object sensed by the fingerprint sensor and a previously stored fingerprint pattern, and the controller stops the booting process responsive to determining that the fingerprint pattern does not match the previously stored fingerprint pattern,
wherein the controller stops the booting process when a temperature sensed by the temperature sensor is not within a predetermined temperature range;
wherein the controller enables the fingerprint sensor and the temperature sensor when the distance between the external object and the power button is within a predetermined distance.

2. The electronic device as claimed in claim 1, wherein the controller sends the fingerprint pattern to a cloud server responsive to determining that the fingerprint pattern does not match the previously stored fingerprint pattern.

3. The electronic device as claimed in claim 1, wherein responsive to determining that the distance between the external object and the power button is within the predetermined distance, but the external object does not press the power button within a predetermined time, the controller disables the fingerprint sensor and the temperature sensor.

4. A method for securing an electronic device, comprising:
integrating a fingerprint sensor, a temperature sensor and a proximity sensor into a power button;
performing a booting process of the electronic device using a controller in response to the power button being pressed by an external object;
sensing the fingerprint pattern of the external object using the fingerprint sensor; and
comparing the fingerprint pattern and a previously stored fingerprint pattern, wherein responsive to determining that the fingerprint pattern does not match the previously stored fingerprint pattern, the controller stops the booting process,
wherein the method further comprises:
sensing a temperature by the temperature sensor, wherein the controller stops the booting process responsive to determining that the temperature is not within a predetermined temperature range; and
sensing the external object by the proximity sensor, wherein the controller enables the fingerprint sensor and the temperature sensor responsive to determining that the distance between the external object and the power button is within a predetermined distance.

5. The method as claimed in claim 4, wherein the controller sends the fingerprint pattern to a cloud server responsive to determining that the fingerprint pattern does not match the previously stored fingerprint pattern.

6. The method as claimed in claim 4, wherein responsive to determining that the distance between the external object and the power button is within the predetermined distance, but the external object does not press the power button within a predetermined time, the controller disables the fingerprint sensor and the temperature sensor.

* * * * *